J. D. MAYHEW.
COMPRESSOR.
APPLICATION FILED JAN. 13, 1909. RENEWED MAR. 15, 1910.
955,822.
Patented Apr. 19, 1910.
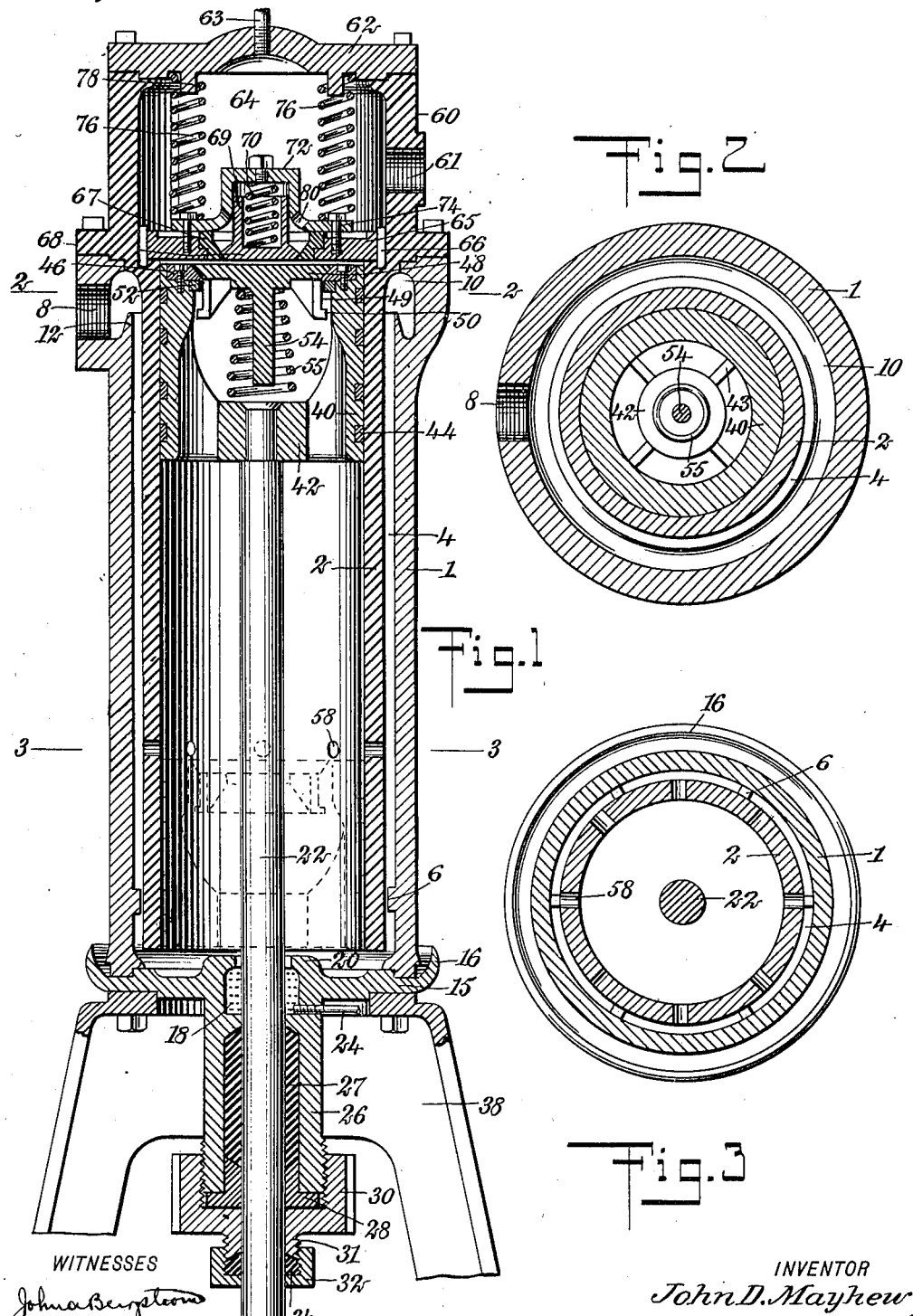
INVENTOR
John D. Mayhew
BY Munn & Co
ATTORNEYS

UNITED STATES PATENT OFFICE.

JOHN DAUGHERTY MAYHEW, OF TYLER, TEXAS, ASSIGNOR OF ONE-SIXTH TO JOHN L. BOOTY, OF TYLER, TEXAS, ONE-SIXTH TO PAUL G. WHALEY AND ONE-SIXTH TO WILLIAM L. MARTIN, BOTH OF MARSHALL, TEXAS, AND ONE-SIXTH TO CALEB W. DAWLEY, OF McALESTER, OKLAHOMA.

COMPRESSOR.

955,822.  Specification of Letters Patent.  Patented Apr. 19, 1910.

Application filed January 13, 1909, Serial No. 472,136. Renewed March 15, 1910. Serial No. 549,442.

*To all whom it may concern:*

Be it known that I, JOHN DAUGHERTY MAYHEW, a citizen of the United States, and a resident of Tyler, in the county of Smith and State of Texas, have invented a new and Improved Compressor, of which the following is a full, clear, and exact description.

This invention relates to compressors employed in connection with ammonia, ice or refrigerating machines that compress the gas from the coils into the condenser.

One object of the invention is to produce a compressor having an improved construction whereby the maximum amount of gas or vapor may be compressed.

A further object is to provide a compressor in which the heat evolved during the operation of compressing the gas or vapor may be utilized to dry the incoming gas.

A further object is to provide means whereby the incoming gas or vapor may be utilized to cool the walls of the compression cylinder.

A still further object is to provide means for preventing liquid from being conveyed to the cylinder by the gas or vapor.

The invention consists in the construction and combination of parts to be more fully described hereinafter and particularly set forth in the claims.

Reference it to be had to the accompanying drawings forming a part of this specification, in which similar characters of reference indicate corresponding parts in all the views, and in which—

Figure 1 is a central vertical section through the compressor; Fig. 2 is a horizontal section taken on the line 2—2 in Fig. 1; and Fig. 3 is a horizontal section taken on the line 3—3 in Fig. 1.

In said drawings, the body of the compressor comprises two concentric cylinders, 1 and 2, which may be united by bolts at their upper ends. Said cylinders are separated by an annular space 4. A plurality of projections or guides 6 are formed on the inner periphery of the outer cylinder for the purpose of centering the lower end of the inner cylinder. An inlet 8 is formed near the upper end of the outer cylinder 1 and communicates with an annular recess 10, the outer cylinder having a flange 12 projecting upwardly from its inner edge. The purpose of this flange is to entrap any liquid which may be conveyed to the compressor by the gas or vapor entering the inlet 8.

A cylinder head 15 is bolted to the lower end of the cylinder 1, and is provided at its outer edge with an upturned drip flange 16. A chamber 18 is formed at the center of the cylinder head 15, and the upper end 20 of said chamber is raised slightly above the inner face of the cylinder head 15. This forms an annular space or trap at the bottom of the cylinder 1, which will receive any liquid which may have escaped over the flange 12 and reached the bottom of said cylinder. This will prevent the liquid from coming in contact with the piston rod 22 and causing the same to become clogged. The chamber 18 may be filled with oil, which may be supplied through a pipe 24.

The walls of the chamber 18 are prolonged downwardly to form the walls of a stuffing box 26. Packing 27 surrounds the piston rod 22, and is held in position by a gland 28, which is in turn held by a nut 30. The lower end of the nut 30 is screw-threaded at 31, to receive a cup 32, within which suitable packing 34 may be held to catch any oil which may tend to creep down along the piston rod 22.

The compressor cylinders are mounted upon a frame or support 38, which is bolted to the lower end of the outer cylinder. Within the cylinder 2 is a piston 40, having a central boss 42 which is connected to the outer portion of the piston by webs 43. The cylindrical portion of the piston is provided with grooves, within which packing rings 44 are retained. At the upper end of the piston 40 is an annular valve seat 46 secured to the end of said piston by means of bolts. Said valve seat is provided with a conical opening for receiving the conical end of a valve body 48. Said valve body 48 is provided with depending webs 49 spaced apart and preferably four in number, the webs each having a shoulder 50 formed at its lower end. The webs 49 form a guide for the valve body and the purpose of the shoulders 50 is to prevent the valve body from rising too far above its seat, the shoulders 50 coming in contact with the under side of a packing ring 52. This packing ring 52 is made in two parts so that it can be readily placed in position. The valve body 48 is also provided with a central depending stem 54, which is surrounded by a spiral spring 55 adapted to rest upon the upper face of the boss 42 and against the under side of the valve body 48. The purpose of this spring is to lift the valve 48 from its seat, in order to aid the admission of gas to the upper side of the piston when said piston is moved downwardly. When the valve 48 is lifted from its seat, the gas passes between the webs 49.

The cylinder 2 is provided with a series of ports 58, which are located a sufficient distance above the lower end of said cylinder to enable the piston 40 to come below them, as shown in the dotted-line position in Fig. 1, and thereby allow the vapor to pass from the annular chamber 4 through ports 58, thereby filling the cylinder 2 with gas of the same pressure as that in the chamber 4.

The upper end of the cylinder 2 is prolonged integrally by a cylindrical valve casing 60, having an outlet port 61 formed in one side thereof. A cylinder head 62 is bolted to the upper end of the casing 60, and may be provided with a clearing pipe 63. A false cylinder head 65 is slidably mounted at the bottom of the valve casing 60 and retained in proper position by guides 66. Said false cylinder head is provided with a central valve seat 67, adapted to receive a valve body 68. Said valve body is provided with an upwardly extending hollow boss 69 for the reception of a spring 70. Said spring rests against the bottom of the cavity in the boss 69, and also against the inside of the hood 72, which forms a guide for the boss 69. Said hood 72 is formed with an annular flange 74 at its base, which flange bears against the upper face of the valve seat 67, and is retained in position by bolts, passing through said flange and into the false cylinder head 65. Springs 76 rest upon the upper surface of the flange 74, and their upper ends surround lugs 78 formed on the inner face of the cylinder head 62. The hood 72 is provided with a series of apertures 80, which allow the gas to escape from said hood into the chamber 64 when the valve body 68 is raised from its seat.

From the construction above set forth, it will be seen that the gas or vapor coming through the inlet 8 will come in contact with the flange 12, and any liquid conveyed by said gas will be entrapped behind said flange in the chamber 10. The vapor passing over said flange into the annular chamber 4 will be heated and dried by coming in contact with the walls of the inner cylinder 2, which has become heated through the compression of gas within the same. As the vapor travels downwardly through said chamber 4 and reaches the lower end of the cylinder 2, it operates to cool the lower end of said cylinder much more effectively than would be done by cooling water. The heated vapor will evaporate the liquid in the trap 10 and will also tend to evaporate that which may be held in the lower trap 16 at the bottom of said cylinders. The valve 48 is nearly balanced, and when it reaches its lowest position, as shown in dotted lines in Fig. 1, the vapor pressure above the piston 40 will be equalized, since free communication is afforded between the chamber 4 and the interior of the cylinder 2 by means of the ports 58. The upward movement of the piston 40 compresses the gas within the cylinder 2 and forces it through the valve 68 and out of the ports 80 through the outlet 61, as is readily understood. From this construction, it will be seen that the cylinder 2 will be filled with the gas at a low temperature, and a given displacement will handle a large amount of gas.

Having thus described my invention, I claim as new and desire to secure by Letters Patent:—

1. In a compressor, the combination of two concentric cylinders forming an annular chamber therebetween, the outer of which is provided with an annular channel and an inlet communicating therewith, a series of ports in the walls of the inner cylinder, a piston moving within said inner cylinder and arranged to go below said ports, a valve in the end of said piston, a valve chamber above said cylinders, a valve in the base of said chamber, and an outlet in said valve chamber.

2. In a compressor, the combination of two concentric cylinders, united at their upper ends and forming an annular chamber therebetween, a recess formed within the outer cylinder near the upper end thereof and having an annular flange at one edge thereof, guides for separating said cylinders at their lower ends, ports in the walls of said inner cylinder intermediate the length thereof, a piston within said inner cylinder adapted to move below said ports, and means whereby the gas may be discharged from the compressor.

3. In a compressor, the combination of a pair of concentric cylinders, separated to form an annular chamber therebetween and united at their upper ends, a trap formed at the upper end of the outer cylinder, a cylinder head secured to the lower end of the outer cylinder and provided with an upturned drip flange, a central boss extending upwardly from said cylinder head and forming an annular space or trap in said cylinder head, the said boss being provided with a central aperture for a piston rod, an oil chamber formed in said cylinder head, means for admitting gas to said cylinders, and means for discharging the gas therefrom.

4. In a compressor, the combination of a pair of concentric cylinders, separated to form an annular chamber therebetween, a piston arranged to travel within the inner cylinder and having a valve body provided with depending webs and a depending central stem, the said webs each having a shoulder at its lower end, a spring surrounding said stem and tending to raise said valve body, a packing ring secured in a recess in the inner face of the wall of the piston at the upper end thereof, and adapted to be engaged by the shoulders of said webs to limit the upward movement of the valve body, a valve casing above said cylinders, and a valve in said casing.

5. In a compressor, the combination of a pair of vertical concentric cylinders, a trap formed at the upper end of said cylinders, a trap at the lower end of said cylinders, means for supplying gas to said cylinders, means for compressing the gas, and means for discharging the compressed gas.

6. In a compressor, the combination of a pair of vertical concentric cylinders, separated to form an annular chamber therebetween, a trap at the upper end of said chamber, means for supplying gas to said cylinders, means for compressing the gas, and means for discharging the gas.

7. In a compressor, the combination with an outer cylinder provided with an inlet near its upper end, of an inner cylinder spaced from the outer cylinder to form an annular chamber, a trap at the upper end of said chamber, the inner cylinder being united to the upper end of the outer cylinder and having at its upper portion an integral cylindrical extension provided at its upper end with a cylinder head, the said extension of the inner cylinder forming a valve chamber, the said chamber being provided with an outlet, a series of ports in the walls of the inner cylinder opening into the said annular chamber between the cylinders, a piston within the said inner cylinder and arranged to move below the said ports, a valve in the end of the piston, and a valve in the said valve chamber.

8. In a compressor, the combination with the compressor cylinders and means for supplying gas thereto, of a valve casing above said cylinders provided with an outlet, a head slidably mounted at the bottom of the valve casing and provided with a central valve seat, a valve coöperating with said seat and provided with an upwardly extending hollow boss, a hood above said valve forming a guide for the boss, the said hood having an annular flange at its base bearing against the upper face of the valve seat and secured to the said head, a spring held within said hood and said hollow boss, springs held in the valve casing and bearing against the flange of the hood, the said hood being provided with a series of apertures for the escape of gas into the valve casing when the valve is raised, and means for compressing the gas and forcing it through the said valve.

9. In a compressor, the combination with the compressor cylinder and means for supplying gas to said cylinder, of a hollow piston arranged to travel in said cylinder to compress the gas, the said piston having a central boss connected by webs to the outer portion of the piston, an annular valve seat removably secured to the end of the piston and provided with a conical opening, a valve body having a conical end for engaging the valve seat, the said valve body being provided with a depending stem and also provided with depending webs each having a shoulder at its lower end, a spring surrounding said stem and bearing against the upper face of the said boss and the under side of the valve body, the said spring tending to lift the valve body from its seat, a packing ring fitting in a recess in the inner face of the wall of the piston at the upper end thereof and engaging the lower face of the said valve seat, the said packing ring being adapted to be engaged by the said shoulders of the webs to limit the upward movement of the valve body, and means for discharging the compressed gas from said cylinder.

In witness whereof I have signed my name to this specification in the presence of two subscribing witnesses.

JOHN DAUGHERTY MAYHEW.

Witnesses:
O. M. BOYEN,
FORREST MATHIS.